US012715325B2

(12) United States Patent
Jang et al.

(10) Patent No.: US 12,715,325 B2
(45) Date of Patent: Aug. 25, 2026

(54) FOUR-WHEEL DRIVE ELECTRIFIED VEHICLE WITH CHARGING SYSTEM UTILIZING MOTOR AND MULTIPLE INVERTERS

(71) Applicants: Hyundai Motor Company, Seoul (KR); Kia Corporation, Seoul (KR)

(72) Inventors: Ho Sun Jang, Hwaseong-si (KR); Jin Wook Kang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/938,517

(22) Filed: Nov. 6, 2024

(65) Prior Publication Data

US 2025/0360820 A1 Nov. 27, 2025

(30) Foreign Application Priority Data

May 27, 2024 (KR) ........................ 10-2024-0068691

(51) Int. Cl.

*B60L 53/62* (2019.01)
*B60L 53/24* (2019.01)
*H02J 7/24* (2006.01)
*H02P 5/74* (2006.01)

(52) U.S. Cl.

CPC ............ *B60L 53/24* (2019.02); *H02J 7/2434* (2020.01); *H02P 5/74* (2013.01); *B60L 2220/56* (2013.01); *B60L 2240/425* (2013.01)

(58) Field of Classification Search

CPC ................................ B60L 53/24; B60L 53/63
See application file for complete search history.

(56) References Cited

U.S. PATENT DOCUMENTS

| | | | | |
|---|---|---|---|---|
| 2008/0258661 | A1* | 10/2008 | Nagashima | H02P 27/08 318/400.29 |
| 2018/0131291 | A1* | 5/2018 | Lavieville | H02M 7/483 |
| 2024/0305183 | A1* | 9/2024 | Kim | B60L 53/24 |
| 2024/0308379 | A1* | 9/2024 | Prasad | B60L 53/63 |

FOREIGN PATENT DOCUMENTS

| | | | |
|---|---|---|---|
| JP | 5644070 | B2 | 12/2014 |
| KR | 10-2023-0001942 | A | 1/2023 |
| KR | 10-2023-0119441 | A | 8/2023 |

* cited by examiner

*Primary Examiner* — Menatoallah Youssef
*Assistant Examiner* — Esayas G Yeshaw
(74) *Attorney, Agent, or Firm* — Morgan, Lewis & Bockius LLP

(57) ABSTRACT

A multi-charging system using a plurality of inverters, may include a battery, a first motor, a first inverter connected to the battery and the first motor to include a plurality of first switching elements, a second motor, a second inverter connected to the battery and the second motor and including a plurality of second switching elements, a charging switch selectively connecting a neutral point of the first motor or a neutral point of the second motor to a charging power input stage, and a controller configured for controlling the charging switch to connect to the neutral point of the first motor or the neutral point of the second motor in response to charging the battery with power input through the charging power input stage.

12 Claims, 9 Drawing Sheets

FIG. 4

C3
30
S35
S33
S31
S36
S34
S32
S10
S10A
S10B
S10C
L1
100
L3
L2
S15
S13
S11
S16
S14
S12
10
C1
S100D
1000
+
Vin
−
+
Vbat
−
200

FIG. 8

FOUR-WHEEL DRIVE ELECTRIFIED VEHICLE WITH CHARGING SYSTEM UTILIZING MOTOR AND MULTIPLE INVERTERS

CROSS-REFERENCE TO RELATED APPLICATION

The present application claims priority to Korean Patent Application No. 10-2024-0068691, filed on May 27, 2024, the entire contents of which is incorporated herein for all purposes by this reference.

BACKGROUND OF THE PRESENT DISCLOSURE

Field of the Present Disclosure

The present disclosure relates to a four-wheel drive electrified vehicle with a multi-charging system using a plurality of inverters, and more particularly, to a four-wheel drive electrified vehicle configured to charge the vehicle's battery through multi-charging technology using front wheel and rear wheel motors and inverters connected to the motors.

Description of Related Art

Electric vehicles (EVs) or plug-in hybrid electric vehicles (PHEVs) typically convert power provided by an external charging facility into a state suitable for charging the in-vehicle battery and deliver the converted power to the battery to charge the battery.

Traditionally, charging facilities for fast charging have been designed to output a single voltage standard of 400 V. However, the trend in battery design is shifting toward a higher voltage of 800 V or more, aiming to enhance efficiency and extend the driving range of the in-vehicle battery. Battery charging for vehicles having different battery voltage specifications requires either a range of charging stations with varying specifications of voltage or multi-voltage charging stations configured to output multiple voltage levels.

Not only does the construction of such charging infrastructure pose the problem of incurring substantial costs, but there arises the problem of increased charging time caused by reduced charging power in response that lowered voltage is output due to the charging current limitations of the charging station.

Accordingly, in the present field of technology, there is a need for a battery charging method that utilizes a motor drive system, including an inverter and a motor, to enable battery charging by adjusting the magnitude of charging voltage provided at the charging stations built with existing infrastructure without requiring additional equipment or additional costs.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing the boosting of the external input voltage utilizing a motor and an inverter of each front and rear wheel PE system in response that boosting the external input voltage is required for battery charging. In the present process, in response that a plurality of inverters is present, alternate use of the plurality of inverters may reduce energy loss during charging caused by switching element overheating inside the inverters and allow faster charging than when only one inverter is used. Furthermore, alternate use of the plurality of inverters may prevent the burning of the switching elements inside the inverters caused by overheating during the charging process.

The technical issues to be resolved by the present disclosure are not limited to the technical issues mentioned above, and other technical issues not mentioned will be clearly understood by those skilled in the art to which the present disclosure pertains from the following description.

To resolve the issues described above, the present disclosure proposes an electrified vehicle including a battery; a first motor; a first inverter connected to the battery and the first motor and including a plurality of first switching elements; a second motor; a second inverter connected to the battery and the second motor and including a plurality of second switching elements; a charging switch configured to selectively connect the neutral point of the first motor or a neutral point of the second motor to a charging power input stage; and a controller configured to control the charging switch to connect the charging power input stage to the neutral point of the first motor or the neutral point of the second motor in response to charging the battery with power input through the charging power input stage.

According to an exemplary embodiment of the present disclosure, the first motor may include a plurality of first windings, the first end of each first winding connected to the first inverter, and the second motor may include a plurality of second windings, the first end of each second winding connected to the second inverter.

According to an exemplary embodiment of the present disclosure, the second ends of the plurality of first windings may be interconnected to form a neutral point of the first motor and the second ends of the plurality of second windings may be interconnected to form a neutral point of the second motor.

According to an exemplary embodiment of the present disclosure, the charging switch may include a state 1 in which the charging power input stage connects to the neutral point of the first motor and a state 2 in which the charging power input stage connects to the neutral point of the second motor.

According to an exemplary embodiment of the present disclosure, the controller may be further configured to control the charging switch to alternate between the state 1 and the state 2.

According to an exemplary embodiment of the present disclosure, the controller may be further configured to control the switching between the state 1 and the state 2 based on at least either the temperature of the plurality of first switching elements or the temperature of the plurality of second switching elements.

According to an exemplary embodiment of the present disclosure, the controller may be further configured to turn off the second inverter, control the charging switch into the state 1, and control the first inverter using pulse-width modulation to boost the external input voltage and charge the battery in response that the external input voltage meets a preset condition.

According to an exemplary embodiment of the present disclosure, the controller may be further configured to turn off the first inverter, switch the charging switch into the state 2, and control the second inverter using pulse-width modulation to boost the external input voltage and charge the battery in response that the temperature of at least one of the plurality of first switching elements is higher than a preset temperature or same during charging through pulse-width modulation control of the first inverter.

According to an exemplary embodiment of the present disclosure, the controller may be further configured to turn off the second inverter, control the charging switch into the state 1, and control the first inverter using pulse-width modulation to boost the external input voltage and charge the battery in response that the temperature of at least one of the plurality of second switching elements is higher than a preset temperature or same during charging through pulse-width modulation control of the second inverter.

In an exemplary embodiment of the present disclosure, the electrified vehicle may further include a third inverter that includes a plurality of third switching elements and is connected to a second end of each first winding, and a first changeover switch including a plurality of fourth switching elements, one end of each fourth switching element connected to the second end of each first winding and the other ends interconnected.

According to an exemplary embodiment of the present disclosure, the first changeover switch may provide a neutral point of the first motor in response that the plurality of fourth switching elements are turned on.

According to an exemplary embodiment of the present disclosure, the charging switch may include a state 1 in which the charging power input stage is connected to the other end of the first changeover switch and a state 2 in which the charging power input stage is connected to the neutral point of the second motor.

According to an exemplary embodiment of the present disclosure, the controller may be configured for controlling the charging switch to alternate between the state 1 and the state 2.

According to an exemplary embodiment of the present disclosure, the controller may be further configured to control the switching between the state 1 and the state 2 based on at least either the temperature of the plurality of first switching elements or the temperature of the plurality of second switching elements.

According to an exemplary embodiment of the present disclosure, the controller may be further configured to turn off the second inverter, turn on the first changeover switch, control the charging switch into the state 1, and control the first inverter using pulse-width modulation to boost the external input voltage and charge the battery in response that the external input voltage meets a preset condition.

According to an exemplary embodiment of the present disclosure, the controller may be further configured to turn off the first inverter, control the charging switch into the state 2, and control the second inverter using pulse-width modulation to boost the external input voltage and charge the battery in response that the temperature of at least one of the plurality of first switching elements is higher than a preset temperature or same during charging through pulse-width modulation control of the first inverter.

According to an exemplary embodiment of the present disclosure, the controller may be further configured to turn off the second inverter, turn on the first changeover switch, control the charging switch into the state 1, and control the first inverter using pulse-width modulation to boost the external input voltage and charge the battery in response that the temperature of at least one of the plurality of second switching elements is higher than a preset temperature or same during charging through pulse-width modulation control of the second inverter.

In an exemplary embodiment of the present disclosure, the electrified vehicle may further include a fourth inverter that includes a plurality of fifth switching elements and is connected to a second end of each first winding, and a second changeover switch including a plurality of sixth switching elements, one end of each sixth switching element connected to the second end of the plurality of second windings and the other ends interconnected.

In an exemplary embodiment of the present disclosure, the electrified vehicle may further include a third changeover switch with one end respectively connected to the first end of the plurality of first windings and the other ends interconnected; and a fourth changeover switch with one end respectively connected to the second end of the plurality of second windings and the other ends interconnected, wherein the neutral point of the first motor may be formed at the other end of the first changeover switch or the other end of the third changeover switch, and the neutral point of the second motor may be formed at the other end of the second changeover switch or the other end of the fourth changeover switch.

According to an exemplary embodiment of the present disclosure, the charging switch may include a state 1 in which the charging power input stage is connected to the first changeover switch, a state 2 in which the charging power input stage is connected to the second changeover switch, a state 3 in which the charging power input stage is connected to the third changeover switch, or a state 4 in which the charging power input stage is connected to the fourth changeover switch.

According to an exemplary embodiment of the present disclosure, alternate use of a front wheel motor and an inverter connected to the front wheel motor, and a rear wheel motor and the inverter connected to the rear wheel motor in response that boosting the external input voltage through a charger may reduce energy loss caused by the temperature increase of the switching elements and enhance the charging efficiency. Furthermore, the effect of preventing the burning or deterioration of durability of the switching elements caused by the temperature increase of the switching element may be achieved.

Furthermore, alternate use of the front wheel and rear wheel inverters may provide higher stability and durability than the use of the inverter of the front wheel motor or the inverter of the rear wheel motor alone during charging.

The effects to be obtained from the present disclosure are not limited to an effect mentioned above, and other effects not mentioned may be clearly understood by those skilled in the art to which the present disclosure pertains from the following description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 4 is a circuit diagram for describing a multi-charging method in a dual inverter system according to an exemplary embodiment of the present disclosure.

FIG. 8 and FIG. 9 are flowcharts illustrating a controller performing alternation between a multi-charging 1 method and a multi-charging 2 method based on switching element temperature according to an exemplary embodiment of the present disclosure.

Figure 1:
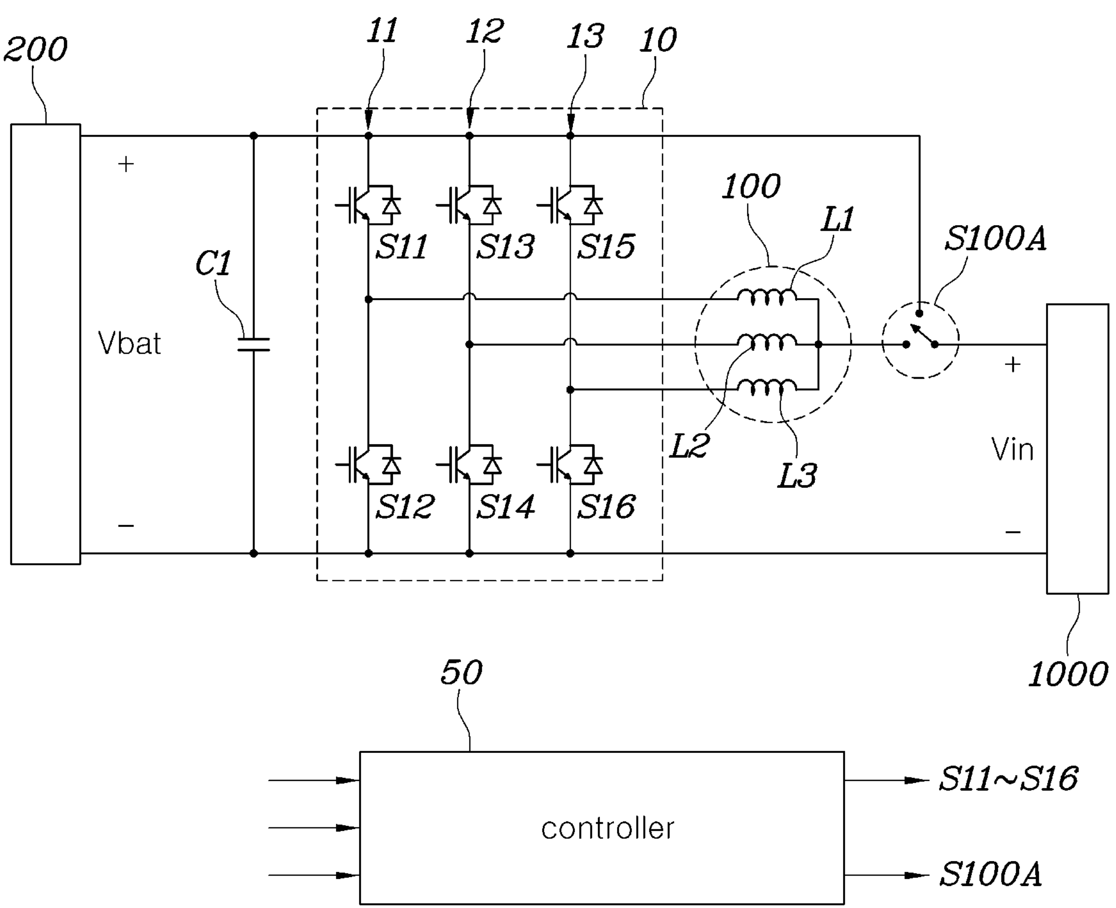
FIG. 1 is a circuit diagram of a vehicle battery charging system using a motor drive system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments included in the present disclosure will be described in detail with reference to the accompanying drawings, but the same reference numerals will be assigned to the similar or same components regardless of drawing numbers and repetitive descriptions will be omitted. The suffixes "module" and "unit" for the components used in the following description are provided or interchangeably used only to facilitate the writing of the specification, without necessarily indicating a distinct meaning or role of their own. Furthermore, in response that it is determined that the specific description of the related and widely known technology may obscure the essence of the exemplary embodiments included herein, the specific description will be omitted. Furthermore, it is to be understood that the accompanying drawings are only intended to facilitate understanding of the exemplary embodiments included herein and are not intended to limit the technical ideas included herein are not limited to the accompanying drawings and include all the modifications, equivalents, or substitutions within the spirit and technical scope of the present disclosure.

The terms including ordinal numbers such as first, second, and the like may be used to describe various components, but the components are not to be limited by the terms. The terms may only be used for distinguishing one component from another.

It is to be understood that in response that a component is referred to as being "connected" or "coupled" to another component, the component may be directly connected or coupled to another component, but other components may be interposed therebetween. In contrast, it is to be understood that no other component is interposed in response that a component is referred to as being "directly connected" or "directly coupled" to another component.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

Furthermore, a unit or a control unit included in the names such as a motor control unit (MCU), a hybrid control unit (HCU), and the like is a term widely used in the naming of control units that control specific functions of a vehicle and does not mean a generic function unit. For example, each control unit may include a communication device that communicates with other control units or sensors to control the functions for which the control unit is responsible, a memory that stores a drive system or logic instructions and input and output information, and one or more processors that perform determinations, calculations, decisions, and the like required for controlling the functions for which the control unit is responsible.

The present disclosure will be described in more detail through the exemplary embodiments below. The exemplary embodiments are intended to illustrate the present disclosure only, and do not the scope of the protection of rights of the present disclosure.

First, it is to be noted that a 'multi-charging' method refers to a charging method which may allow battery charging that accommodates various external input voltages. For example, in response that the external input voltage of a fast charger is higher than the preset charging voltage of a high-voltage battery, the external input voltage may be used directly for battery charging. In contrast, in response that the external input voltage is lower than the preset charging voltage of the battery, the motor drive system according to the exemplary embodiments of the present disclosure may be used to boost the external input voltage to charge the battery. However, to distinguish the multi-charging method from the standard fast charging method that does not require boosting, the 'multi-charging' method will be used to refer to a charging method that requires voltage boosting in the following embodiments for the convenience of description.

A configuration of a motor drive system and a multi-charging method using the motor drive system will be described with reference to FIG. 1.

FIG. 1 is a circuit drawing of a vehicle battery charging system using a motor drive system according to an exemplary embodiment of the present disclosure.

The motor drive system may include a motor 100, a first inverter 10 including a plurality of first switching elements S11, S12, S13, S14, S15 and S16, and a charging switch S100A connecting to a high-voltage battery 200.

The motor 100 may include a plurality of windings L1, L2 and L3 corresponding to a plurality of phases. In the instant case, the first inverter 10 may be connected to one end of the motor 100, and the plurality of windings L1, L2 and L3 may be interconnected at the other end to form a neutral point.

The first inverter 10 may include a DC stage to which the DC voltage formed between the positive (+) terminal and the negative (−) terminal of the high-voltage battery 200 is applied and an AC stage connecting to each of the windings L1, L2 and L3 of the motor 100. In the present configuration, the two nodes where the first inverter 10 is connected to the positive (+) terminal and negative (−) terminal of the high-voltage battery 200 may form the DC stage of the first inverter 10 and the three nodes where the first inverter 10 is connected to one end of each winding of the motor 100 may form an AC stage of the first inverter 10.

The first inverter 10 may include a plurality of legs 11, 12 and 13 to which the DC voltage formed in the DC stage is applied. Each of the legs 11, 12 and 13 may correspond to each of phases of the motor 100 to form an electrical connection.

The first leg 11 includes two switching elements S11, S12 connected in series with each other between two nodes forming a DC stage. The connection nodes of the two switching elements S11, S12 may be connected to one end of a winding L1 of one phase in the motor 100 to allow AC power input and output corresponding to a phase of a plurality of phases of the motor 100.

Similarly, the second leg 12 includes two switching elements S13, S14 connected in series with each other between two nodes forming a DC stage. The connection nodes of the two switching elements S13, S14 may be connected to one end of a winding L2 of one phase in the motor 100 to allow AC power input and output corresponding to one phase of a plurality of phases of the motor 100.

Furthermore, the third leg 13 includes two switching elements S15, S16 connected in series with each other between two nodes forming a DC stage. The connection nodes of the two switching elements S15, S16 may be connected to one end of a winding L3 of one phase in the motor 100 to allow AC power input and output corresponding to one phase of a plurality of phases of the motor 100.

At the present time, the switching elements S11, S12, S13, S14, S15 and S16 included in the first inverter 10 are switching elements included in typical inverters for motor drive and should be conceptually understood as components including an insulated gate bipolar transistor (IGBT) or a field effect transistor (FET) in which the actual switching takes place and a diode connected in reverse between the source and drain of the IGBT or FET.

For the sake of a specific description, it is to be noted that the upper switching elements refer to the switching elements S11, S13, S15, among the two switching elements included in each leg in the first inverter 10, connected to the high-potential terminal of the DC stage while the lower switching elements refer to the switching elements S12, S14, S16, among the two switching elements included in each leg in the first inverter 10, connected to low-potential terminal of the DC stage.

The charging switch S100A may selectively connect the positive (+) terminal of the high-voltage battery 200 or the other end of the motor 100 to the positive (+) terminal of the external fast charger 1000. In other words, the charging switch S100A may include a state 0 in which the positive (+) terminal of the battery 200 connects to the positive (+) terminal of the external fast charger 1000 and a state 1 in which the neutral point of the other end of the motor 100 connects to the positive (+) terminal of the external fast charger 1000. The state of the present charging switch S100A may be controlled based on whether the supply voltage of the external fast charger 1000 meets a preset condition.

A controller 50 may be configured for controlling the motor 100, the first inverter 10, and the charging switch S100A according to preset control modes.

For example, to drive the motor 100, the controller may be configured for controlling the switching elements S11, S12, S13, S14, S15 and S16 included in the first inverter 10 using pulse-width modulation based on the required output demanded by the motor 100 in the motor drive mode.

In response that output from the motor 100 is required, the controller 50 may be configured for controlling the switching elements S11, S12, S13, S14, S15 and S16 of the first inverter 10 using pulse-width modulation to drive the motor 100. The motor drive is achieved by the controller 50 controlling the switching elements S11, S12, S13, S14, S15 and S16 of the first inverter 10 using pulse-width modulation based on the DC voltage applied to the DC stage of the first inverter 100, the phase current provided from the AC stage of the inverter 10 to the motor 100, the motor rotation angle measured by a motor rotor sensor provided in the motor 100, and the like. Since various methods for driving the motor 100 by controlling the plurality of switching elements in the inverter using pulse-width modulation are widely known in the art, a further detailed description of the pulse-width modulation control method of the inverter will be omitted.

Furthermore, the controller 50 may be configured for controlling the first inverter 10 and the charging switch S100A to charge the high-voltage battery 200 according to a preset criterion based on the magnitude of the external input voltage in the battery charging mode.

For example, in response that the external input voltage (e.g., 1000 V) supplied from the external fast charger 1000 is higher than the voltage (e.g., 800 V) of the in-vehicle battery 200 in the charging mode, the charging switching S100A may be controlled into the state 0. Accordingly, the charging power input stage may directly connect to the positive (+) terminal of the battery 200. For the convenience of description, the illustration of the connection node related to the state 0 of the charging switch will be omitted in the drawings following FIG. 1 below.

In response that the external input voltage (e.g., 500 V) supplied from the external fast charger 1000 is lower than the voltage (e.g., 800 V) of the in-vehicle battery 200, the charging switch S100A may be controlled into the state 1. This is because the higher supply voltage of the fast charger 1000 relative to the voltage of the battery 200 allows smooth charging of the battery 200 without boosting while boosting through the motor drive system is required otherwise.

Here, boosting may be performed through a boost converter topology implemented by controlling the switching elements S11, S12, S13, S14, S15 and S16 of the first inverter 10.

For example, a first capacitor C1, the windings L1, L2 and L3 of the motor 100, the diodes of the upper switching elements S11, S13, S15 of the first inverter 10 connected to one end of the windings L1, L2 and L3, and the lower switching elements S12, S14, S16 of the first inverter 10 may form the topology of a boost converter configured to boost the voltage in the direction from the fast charger 1000 to the battery 200. The external input voltage provided by the fast charger 1000 may be boosted using the present boost converter topology and be provided to the battery 200 to enable the charging of the battery 200.

At the present time, in response that all the lower switching elements S12, S14, S16 of the first inverter 10 are used boosting the voltage, the controller 50 may also control the boost converter corresponding to each phase in an interleaved manner. Since the boosting converter including a coil (or inductor, corresponding to the motor winding in an exemplary embodiment of the present disclosure), a diode, and a switch (the inverter in an exemplary embodiment of the present disclosure) to boost the voltage magnitude through pulse-width modulation control of the switch, and the interleaved control method of utilizing a plurality of boosting converters are widely known in the art, their further description will be omitted.

A four-wheel drive electrified vehicle according to an exemplary embodiment of the present disclosure will be described based on the motor drive system and multi-charging method illustrated in FIG. 1

Figure 2:
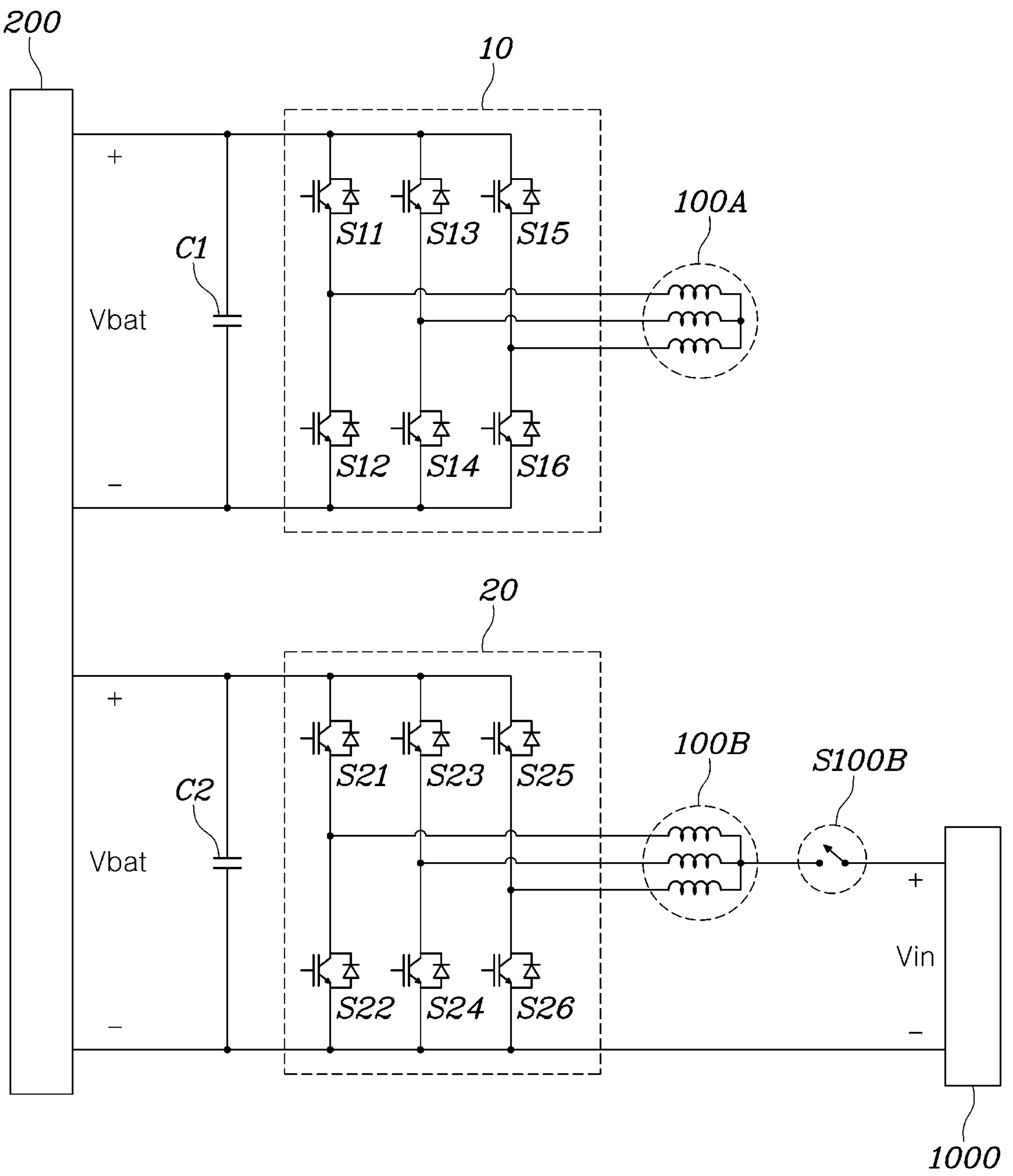
FIG. 2 is a view for describing a motor drive system of a four-wheel drive electrified vehicle according to an exemplary embodiment of the present disclosure.

FIG. 2 is a view for describing a motor drive system of a four-wheel drive electrified vehicle according to an exemplary embodiment of the present disclosure.

Front wheel and rear wheel motor drive systems are respectively implemented similarly to the motor drive system described in FIG. 1, but FIG. 2 shows that only the rear wheel motor drive system is provided with a charging switch S100B.

The front wheel motor drive system (referred to as front wheel PE system hereinafter) may include a front wheel motor 100A, a first inverter 10 including a plurality of first switching elements S11, S12, S13, S14, S15 and S16, and a first capacitor C1. In the present configuration, the front wheel PE system is connected so that the positive (+) DC stage is connected to the positive (+) terminal of the high-voltage battery 200 and the negative (−) DC stage is connected to the negative (−) terminal of the high-voltage battery 200 respectively. The present connection allows the front wheel PE system to receive power from the high-voltage battery 200 or charge the high-voltage battery 200 through regenerative braking in the drive mode.

Similarly, the rear wheel PE system may include a rear wheel motor 100B, a second inverter 20 including a plurality of first switching elements S21, S22, S23, S24, S25 and S26, and a second capacitor C2. Along with these, the rear wheel PE system may further include a charging switch S100B for multi-charging.

Similar to the front wheel PE system, the rear wheel PE system is configured so that the positive (+) DC stage is connected to the positive (+) terminal of the high-voltage battery 200 and the negative (−) DC stage is connected to the negative (−) terminal of the high-voltage battery respectively in the drive mode. The present connection allows the rear wheel PE system to receive power from the high-voltage battery 200 or perform regenerative braking in the drive mode.

In contrast, the controller 50 may perform multi-charging operations using the rear wheel PE system in the charging mode. For example, in response that the external input voltage from the fast charger 1000 is higher than the preset charging voltage of the high-voltage battery 200, the charging switch S100B is controlled into the state 0 to charge the battery 200. In response that the external input voltage from the fast charger 1000 is lower than the preset charging voltage of the high-voltage battery 200, the charging switch S100B is controlled into the state 1 and the switching elements S21, S22, S23, S24, S25 and S26 of the second inverter 20 are controlled to allow multi-charging. Since the multi-charging method of the rear wheel PE system is similar to the multi-charging method described in FIG. 1, a detailed description will be omitted.

However, as shown in FIG. 2, in response that only the second inverter 20 among a plurality of inverters is used for multi-charging, heat generation in the switching elements S21, S22, S23, S24, S25 and S26 inside the second inverter 20 may cause problems such as reduced durability, lowered charging efficiency, increased charging time, and the like.

Therefore, a circuit diagram and control method for performing multi-charging using a plurality of in-vehicle inverters to alleviate these problems in a four-wheel drive vehicle to which the exemplary embodiment of the present disclosure applies will be described with reference to FIG. 3, FIG. 4, FIG. 5, FIG. 6, FIG. 7, FIG. 8, and FIG. 9.

Figure 3:
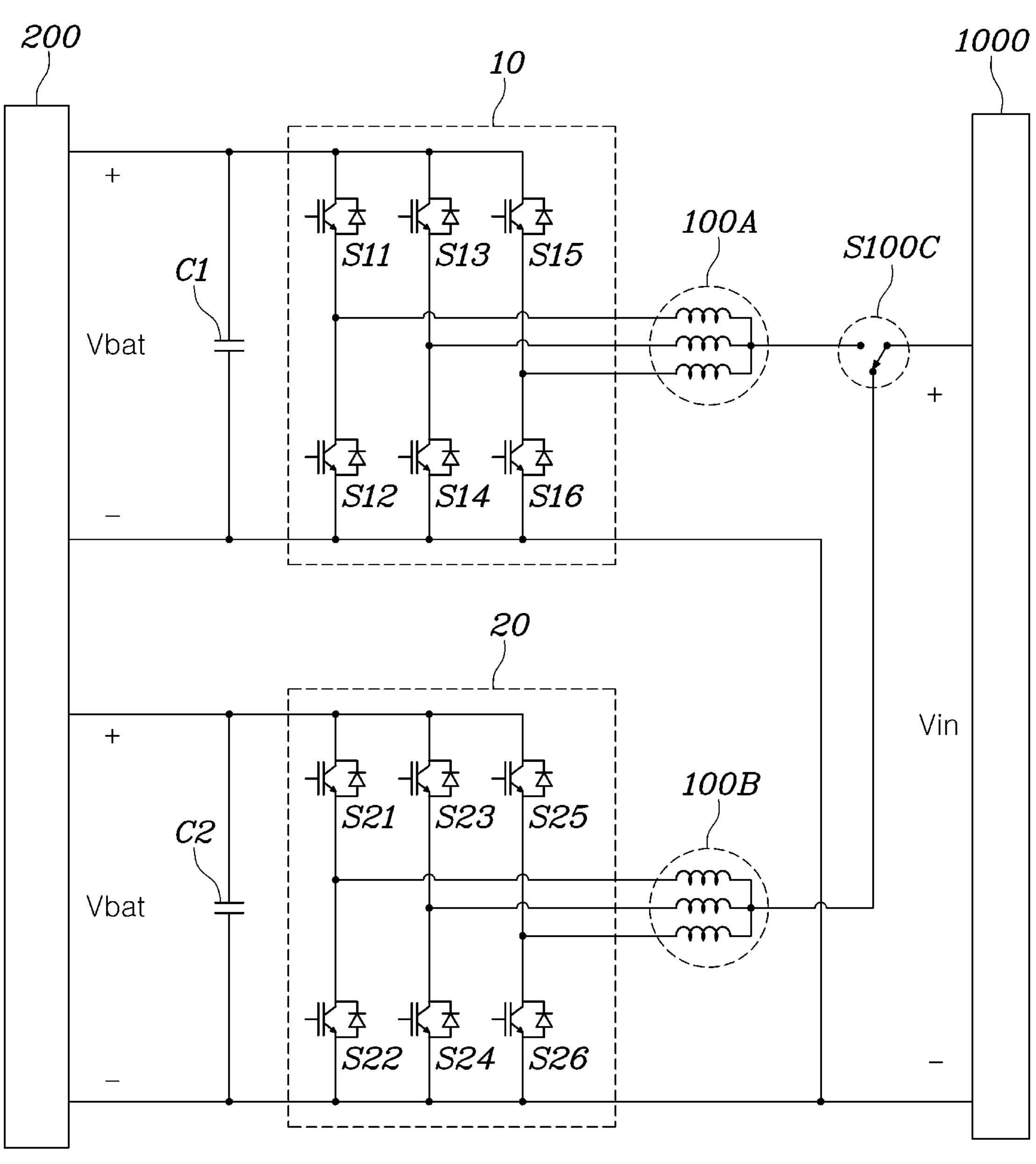
FIG. 3 is a circuit diagram for selectively using a front wheel or rear wheel inverter during multi-charging in a four-wheel drive electrified vehicle according to an exemplary embodiment of the present disclosure.

FIG. 3 is a circuit diagram for selectively using a front wheel or rear wheel inverter during multi-charging in a four-wheel drive electrified vehicle according to an exemplary embodiment of the present disclosure.

In contrast to FIG. 2, the charging switch S100C of the four-wheel drive system in FIG. 3 is configured to selectively connect the positive (+) terminal of the fast charger 1000 to the positive (+) terminal of the battery 200, the other end neutral point of the front wheel motor 100A, or the other end neutral point of the rear wheel motor 100B.

In the instant case, the charging switch S100C may further include a state 2 in addition to the state 0 and state 1s in FIG. 2.

The controller 50 is configured to control the charging switch S100C to selectively switch into the state 0 in which the positive (+) terminal of the charger 1000 connects to the positive (+) terminal of the battery 200, the state 1 in which the positive (+) terminal of the charger connects to the other end of the front wheel motor 100A, or the state 2 in which the positive (+) terminal of the charger connects to the other end of the rear wheel motor 100B.

The states of the charging switch S100C described above are only illustrative examples and are not limited to the states 0, 1, and 2, and an OFF state in which one end of the charging switch S100C connects to no circuit may be further included.

Furthermore, as in the motor drive system in FIGS. 4 to 6 to be described below, the first end connection target of the charging switch S100C may change depending on how the neutral point of the motor is implemented in the motor drive system.

The fuel efficiency (or electricity efficiency) of an electrified vehicle such as an electric vehicle that utilizes torque generated by the motor as power is determined by the power conversion efficiency of the inverter-motor. Therefore, it is crucial to maximize the power conversion efficiency of the inverter and the efficiency of the motor to improve fuel efficiency. Consequently, a motor drive system (referred to as a dual inverter system hereinafter) which may be configured for controlling a motor by connecting a plurality of inverters to a single motor has been provided.

Figure 4:
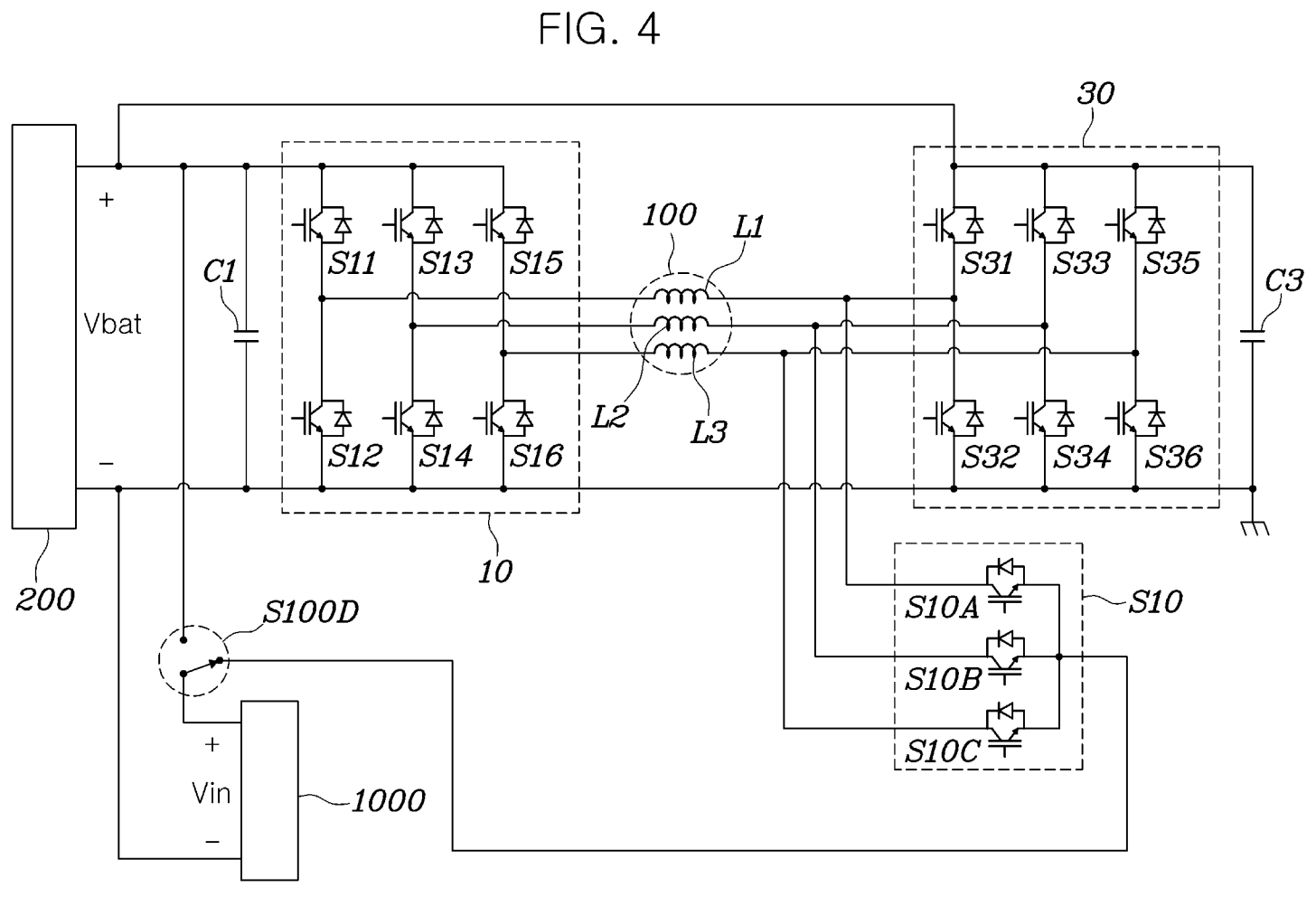

FIG. 4 is a circuit diagram for describing a multi-charging method in a dual inverter system according to an exemplary embodiment of the present disclosure.

In contrast to FIG. 1, FIG. 4 shows that a first changeover switch S10 that connects a third inverter 30 including a plurality of switching elements S31, S32, S33, S34, S35 and S36 to the other end of the windings L1, L2 and L3 of the motor 100 and includes switching elements S10A, S10B and S10C respectively connected to each of the other ends of the windings L1, L2 and L3 of the motor 100 may be further included.

The dual inverter system may drive the motor by selectively choosing between the closed end winding (CEW) mode in which one end of the windings in-vehicle drive motor is interconnected to form a Y-connection to drive the motor and the open end winding (OEW) in which a plurality of inverters are connected to either end of the motor windings to drive the motor with the motor windings open.

In the instant case, the controller 50 may choose an inverter to be used in the motor drive according to preset criteria based on the required output of the motor 100, choose the ON/OFF state of the first changeover switch S10 accordingly, and control the switching elements of the inverter determined to be driven using pulse-width modulation.

In response that the output required for the motor 100 is less than a preset threshold value, the controller 50 may turn on all the plurality of switching elements S10A, S10B and S10C of the first changeover switch S10, turn off the third inverter 30, and control the switching elements S11, S12, S13, S14, S15 and S16 of the first inverter 10 using pulse-width modulation to drive the motor 100 in the CEW mode described above. Since the control of the first inverter 10 by the controller 50 in the CES mode is the same as the description in FIG. 1, a detailed description of the CEW mode will be omitted.

In contrast, in response that the output required for the motor 100 is greater than a preset threshold value, the controller 50 may turn off all the plurality of switching elements S10A, S10B and S10C of the first changeover switch S10 and drive both the first inverter 10 and the third inverter 30 to drive the motor 100 (that is, OEW mode). In the OEW mode, one end of the plurality of windings L1, L2 and L3 of the motor 100 is open to each other and the other end is also open to each other. The present configuration allows motor drive by pulse-width modulation control of the two inverters 10, 20 respectively connected to either end of the windings L1, L2 and L3.

In the OEW mode, the motor 100 may be driven by the controller 50 simultaneously controlling the first switching elements S11, S12, S13, S14, S15 and S16 of the first inverter 10 and the switching elements S31, S32, S33, S34, S35 and S36 of the third inverter 30 using pulse-width modulation upon receiving inputs such as the DC voltage of the first inverter 10 and the third inverter 30, the phase current provided to each of the windings corresponding to each phase of the motor 100, the motor angle measured by the motor rotor sensor provided in the motor 100, and the like. Since various methods for driving the motor 100 through pulse-width modulation control of the two inverters connected to either end of the windings in the OEW mode are widely known in the art, its further detailed description will be omitted.

Furthermore, the controller 50 may be configured for controlling the first inverter 10, the third inverter 30, the first changeover switch S10, and the charging switch S100D to charge the high-voltage battery 200 according to preset criteria based on the magnitude of the external input voltage in the battery charging mode.

As in the exemplary embodiment in FIG. 1, in response that the external input voltage is higher than the preset voltage, the controller 50 may be configured for controlling the charging switch S100D into the state 0 in which the positive (+) terminal of the fast charger 1000 connects to the positive (+) terminal of the high-voltage battery 200.

In the same manner, the controller 50 may be configured for controlling the charging switch S100D into the state 1 in which the neutral point of the motor 100 connects to the positive (+) terminal of the fast charger 1000.

At the present time, one end of the first changeover switch S10 is connected to the motor 100 and the other ends thereof are interconnected so that the neutral point of the motor 100 may be formed at the other end of the first changeover switch S10. Furthermore, the controller 50 may connect the fast charger 1000 and the first changeover switch S10 by controlling the charging switch S100D. Therefore, the state in which the controller 50 controls the charging switch S100D to connect the first changeover switch S10 and the fast charger 1000 may be defined as the state 1 in the circuit in FIG. 4.

For example, in response that the external input voltage of the fast charger 1000 is lower than the preset charging voltage of the battery 200, the controller 50 may be configured for controlling the charging switch S100D into the state 1 and perform multi-charging to charge the battery 200, The controller 50 may boost the external input voltage by controlling the switching elements S11, S12, S13, S14, S15 and S16 of the first inverter 10 while keeping the first changeover switch S10 in the ON state and the switching elements S31, S32, S33, S34, S35 and S36 of the third inverter 30 in the OFF state to charge the battery 200. Since the multi-charging method for controlling the first inverter 10 is similar to the description in FIG. 1, its description will be omitted.

Figure 5:
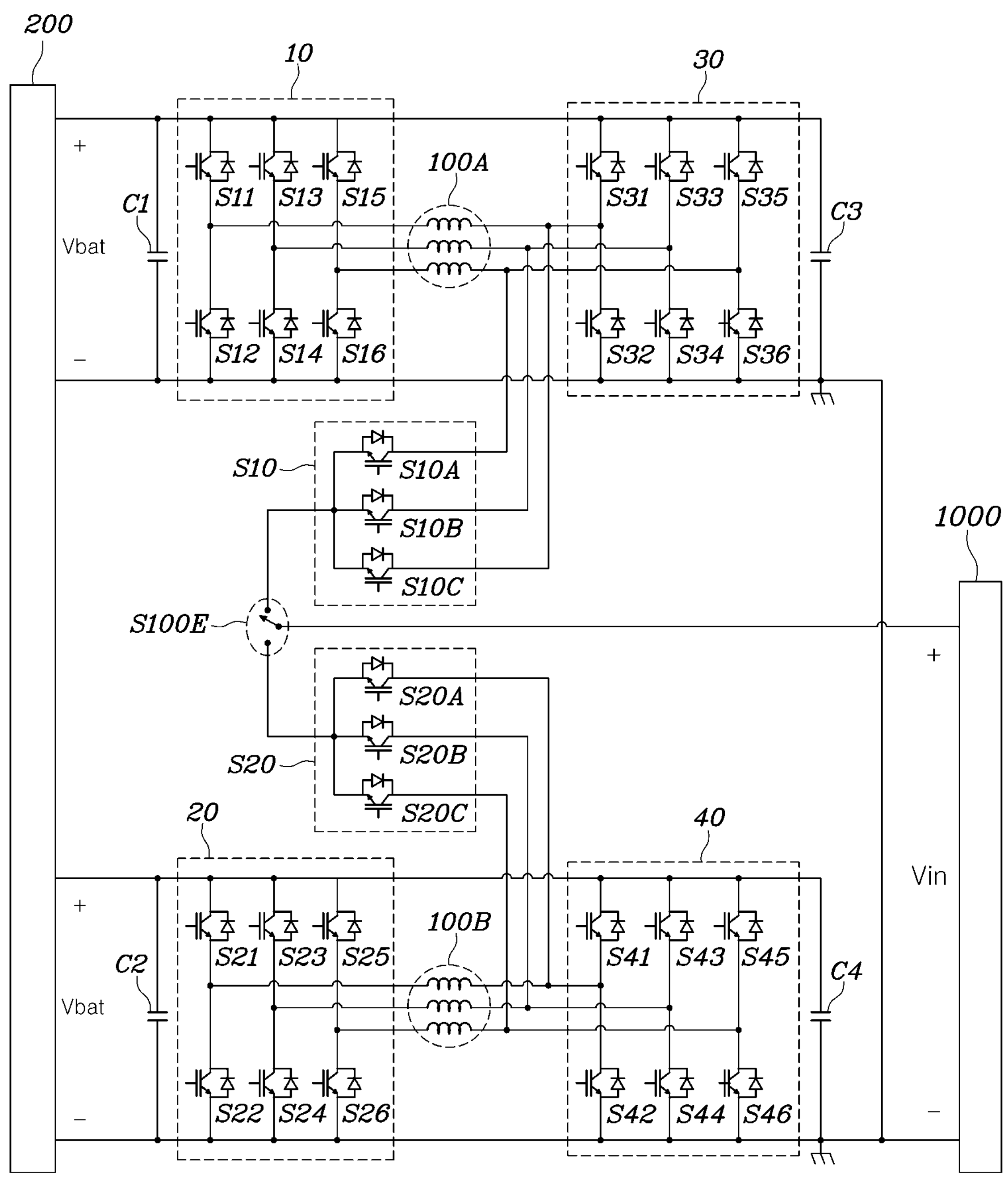
FIG. 5 illustrates a case where the drive system of a four-wheel drive electrified vehicle is a dual inverter system according to an exemplary embodiment of the present disclosure.
Figure 6:
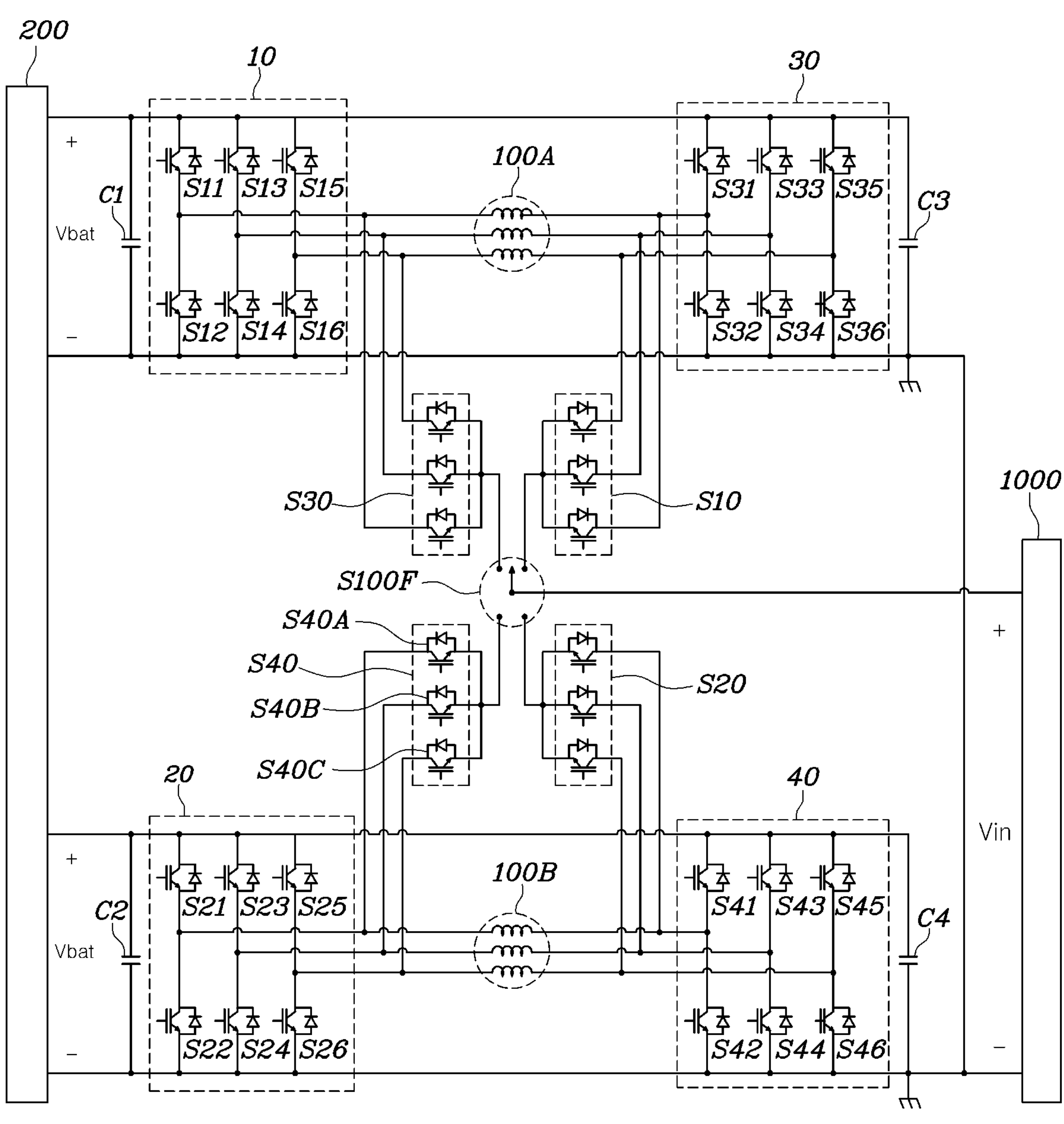
FIG. 6 is a diagram for describing a multi-charging method for alternately using four inverters of a four-wheel driving electrified vehicle according to an exemplary embodiment of the present disclosure.

In FIG. 5 and FIG. 6, the multi-charging of a four-wheel drive electrified vehicle to which an exemplary embodiment of the present disclosure applies will be described with reference to the multi-charging method of the dual inverter system described above.

FIG. 5 illustrates a case where the drive system of a four-wheel drive electrified vehicle is a dual inverter system according to an exemplary embodiment of the present disclosure.

FIG. 5 shows that the four-wheel drive electrified vehicle according to the exemplary embodiment of the present disclosure includes a dual inverter system for the front wheel and rear wheel PE systems.

The front wheel PE system including the first motor 100A, the first inverter 10, the third inverter 30, and the first changeover switch S10, the rear wheel PE system including the second motor 100B, the second inverter 20, a fourth inverter 40, and a second changeover switch S20, and a charging switch S100E selectively connecting the fast charger 1000 to the first changeover switch S10 or the second changeover switch 20 may be included.

In the instant case, the controller 50 may be configured for controlling to perform multi-charging using the first inverter 10. For example, in response that the multi-charging conditions are met, the controller 50 may be configured for controlling the charging switch S100E into the state 1 in which the fast charger 1000 is connected to the neutral point of the first motor 100A formed in the first changeover switch S10. In the instant case, the controller 50 may turn off both the switching elements S21, S22, S23, S24, S25 and S26, S31, S32, S33, S34, S35 and S36, S41, S42, S43, S44, S45 and S46 of the second to four inverters 20, 30, 40 and the switching elements S20A, S20B and S20C of the second changeover switch S20 and turn on all the switch elements S10A, S10B and S10C of the first changeover switch S10 to perform multi-charging by controlling the first inverter 10 using pulse-width modulation.

Another example is the controller 50 controlling the charging switch S100E to switch from the state 1 into the state 2 in response that preset conditions are met. In the instant case, the controller 50 may turn off the first changeover switch S10 and turn on the second changeover switch S20 while keeping the first inverter 10, the third inverter 30, and the fourth inverter 40 in the OFF state. At the instant time, as in the state 1, all the switching elements S20A, S20B and S20C of the second changeover switch may be turned on to perform multi-charging through pulse-width modulation control of the second inverter 20.

In addition to the example described above, the charging switch S100E may further include the state 0 in which the external input voltage is higher than a preset voltage, eliminating the need for multi-charging so that the charging switch S100E connects the positive (+) terminals of the fast charger 1000 and the battery 200 to each other.

FIG. 6 is a diagram for describing a multi-charging method for alternately using four inverters of a four-wheel driving electrified vehicle according to an exemplary embodiment of the present disclosure.

FIG. 6 shows that the exemplary embodiment in FIG. 6 further includes a third changeover switch S30 and a fourth changeover switch S40 and that a charging switch S100F may selectively connect to the third changeover switch S30 or the fourth changeover switch S40.

For example, the controller 50 may utilize the third inverter 30, the third changeover switch S30, and the third capacitor C3 to perform multi-charging by connecting the third changeover switch S 30 to one end of the first motor 100A in the dual inverter front wheel PE system in FIG. 5.

The charging switch S100F may further include a state 3 in which one end of the charging switch S100F is connected to the third changeover switch S30. In the instant case, the first motor 100A, the third inverter 30, the third changeover switch S30, and the third capacitor C3 may form the boost converter circuit, and the controller 50 may perform the multi-charging through the pulse-width modulation control of the fourth inverter 40.

Another example is the controller 50 utilizing the fourth inverter 40, the fourth changeover switch S40, and the fourth capacitor C4 to perform multi-charging by connecting the fourth changeover switch S40 to one end of the second motor 100B in the dual inverter rear wheel PE system in FIG. 5.

The charging switch S100F may further include a state 4 in which one end of the charging switch S100F is connected to the fourth changeover switch S40. In the instant case, as in the multi-charging in the state 3, the second motor 100B, the fourth inverter 40, the switching elements S40A, S40B and S40C of the fourth changeover switch S40, and the fourth capacitor C4 form the boost converter circuit, and the controller 50 may perform multi-charging through the pulse-width control of the fourth inverter 40.

The controller 50 is configured to control the charging switch S100F into the state 1 and the state 2 in FIG. 6. Since the method of controlling the multi-charging accordingly is similar to the multi-charging with the charging switch S100E in the state 1 and the state 2 in the exemplary embodiment in FIG. 5, its detailed description will be omitted.

For the sake of description convenience, the method of connecting the charging switch S100F to the first changeover switch S10 and utilizing the first inverter 10 to perform multi-charging will be referred to as a multi-charging 1 method, the method of connecting the charging switch S100F to the second changeover switch S20 to perform multi-charging will be referred to as a multi-charging 2 method, the method of connecting the charging switch S100F to the third changeover switch S30 will be referred to as a multi-charging 3 method, and the method of connecting the charging switch S100F to the fourth changeover switch S40 to perform multi-charging will be referred to as a multi-charging 4 method respectively.

Figure 7:
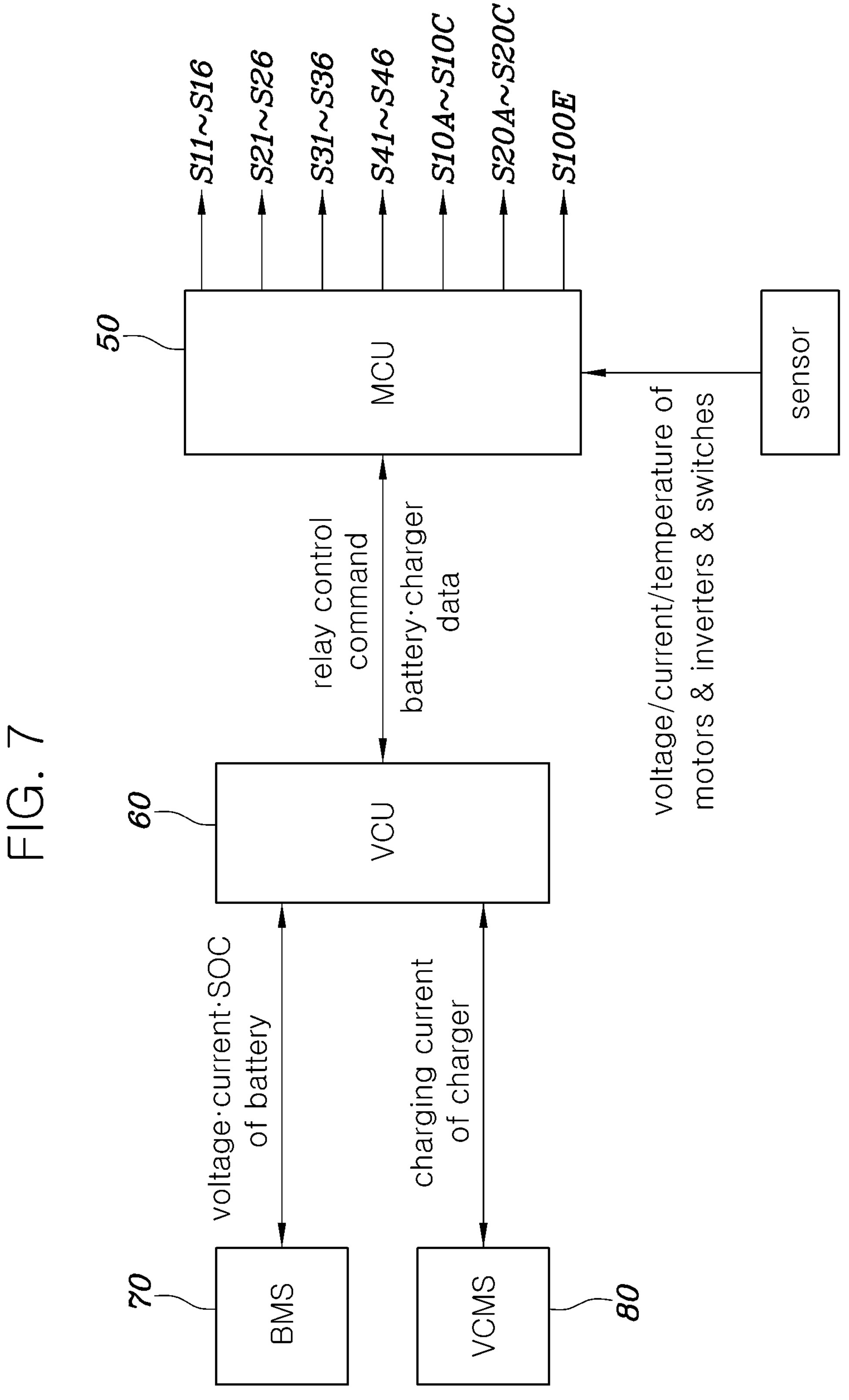
FIG. 7 is a diagram for describing a control system of an electrified vehicle according to an exemplary embodiment of the present disclosure.

FIG. 7 is a diagram for describing a control system of an electrified vehicle according to an exemplary embodiment of the present disclosure.

It is assumed in FIG. 7 that the controller 50 described above is implemented as a motor control unit (MCU) and that the motor drive system illustrated in FIG. 5 applies. FIG. 7 shows that a control system of an electrified vehicle according to various exemplary embodiments of the present disclosure may include the MCU 50, a vehicle control unit (VCU) 60, a battery management system (BMS) 70, and a vehicle charge management system (BCMS) 80.

The MCU 50 may be configured for controlling the front wheel motor 100A, rear wheel motor 100B, the first, second, third and fourth inverters 10, 20, 30, 40, the first changeover switch S10, the second changeover switch S20, and the charging switch S100E. At the instant time, the MCU 50 may be configured for controlling the first, second, third and fourth inverters 10, 20, 30, 40, the first and second changeover switches S10, S20, and the charging switch S100E based on data received from sensors attached to each motor and each inverter or from the vehicle control unit 60.

For example, in response that the external input voltage of the fast charger 1000 is higher than a preset charging voltage, the MCU 50 may be configured for controlling the fourth changeover switch into the state 0.

Another example is the MCU 50 configured to respectively control the first, second, third and fourth inverters 10, 20, 30, 40, the first changeover switch S10, the second changeover switch S20, and the charging switch S100E according to the multi-charging 1 and 2 methods described with reference to FIG. 6 in response that the external input voltage of the fast charger 1000 is lower than a preset charging voltage.

In the instant case, the MCU 50 may be configured for controlling the charging switch S100E on its determination based on the data received previously. Alternatively, as described below, the MCU 50 may be configured for controlling the charging switch S100E based on the control command of the charging switch S100E received from the VCU 60.

The VCU 60 is a high-level controller of the vehicle and refers to a central controller that is configured to control various key operations of the vehicle such as power management, communication, driving control, and the like. For example, the VCU 60 may receive battery information from the BMS 70, collect information related to the external fast charger 1000 from the VCMS 80, and compare the magnitude of the external input voltage and the charging voltage of the battery to control the charging switch S100E into the state 1 or the state 2 depending on whether or not to perform multi-charging. Another example is the VCU 60 transmitting a control command to the MCU 50 to switch the charging switch S100E into the state 1 or the state 2 upon receiving temperature information of the switching elements S11, S12, S13, S14, S15 and S16, S21, S22, S23, S24, S25 and S26 of the first and second inverters 10, 20 from the MCU 50 by the methods to be described below in FIG. 8 and FIG. 9.

The BMS 70 is a system for efficiently and safely using the battery and may collect information related to batteries such as a high-voltage battery 200 and determine their condition. For example, the BMS 70 may collect data such as voltage, current, temperature, and the like of the high-voltage battery 200 collected through a sensor and determine the condition of the battery such as a state of charge (SOC), state of health (SOH), and the like of the high-voltage battery based on the collected data.

The VCMS 80 is a vehicle charge management system configured to manage the start of charging and charging power of the external fast charger 1000. For example, the VCMS 80 may transmit external input voltage information to the VCU 60 during the high-voltage battery 200 charging process through the fast charger 1000. At the instant time, once the charging gets started, the MCU 50 may feedback the input current command of the fast charger 1000 to the VCMS 80, and the VCMS 80 may be configured for controlling the input current of the fast charger 1000 according to the received input current command.

The control system of an electrified vehicle described with reference to FIG. 7 is assumed to be the motor drive system in FIG. 5, but it is apparent to those skilled in the art that the motor drive system in FIG. 5 similarly applies to the motor drive system illustrated in FIG. 1, FIG. 2, FIG. 3, and FIG. 4 and FIG. 6.

A specific method of determining whether or not to perform multi-charging and a method of selecting/switching between multi-charging methods based on the control system described above will be described with reference to FIG. 8 and FIG. 9.

Figure 8:
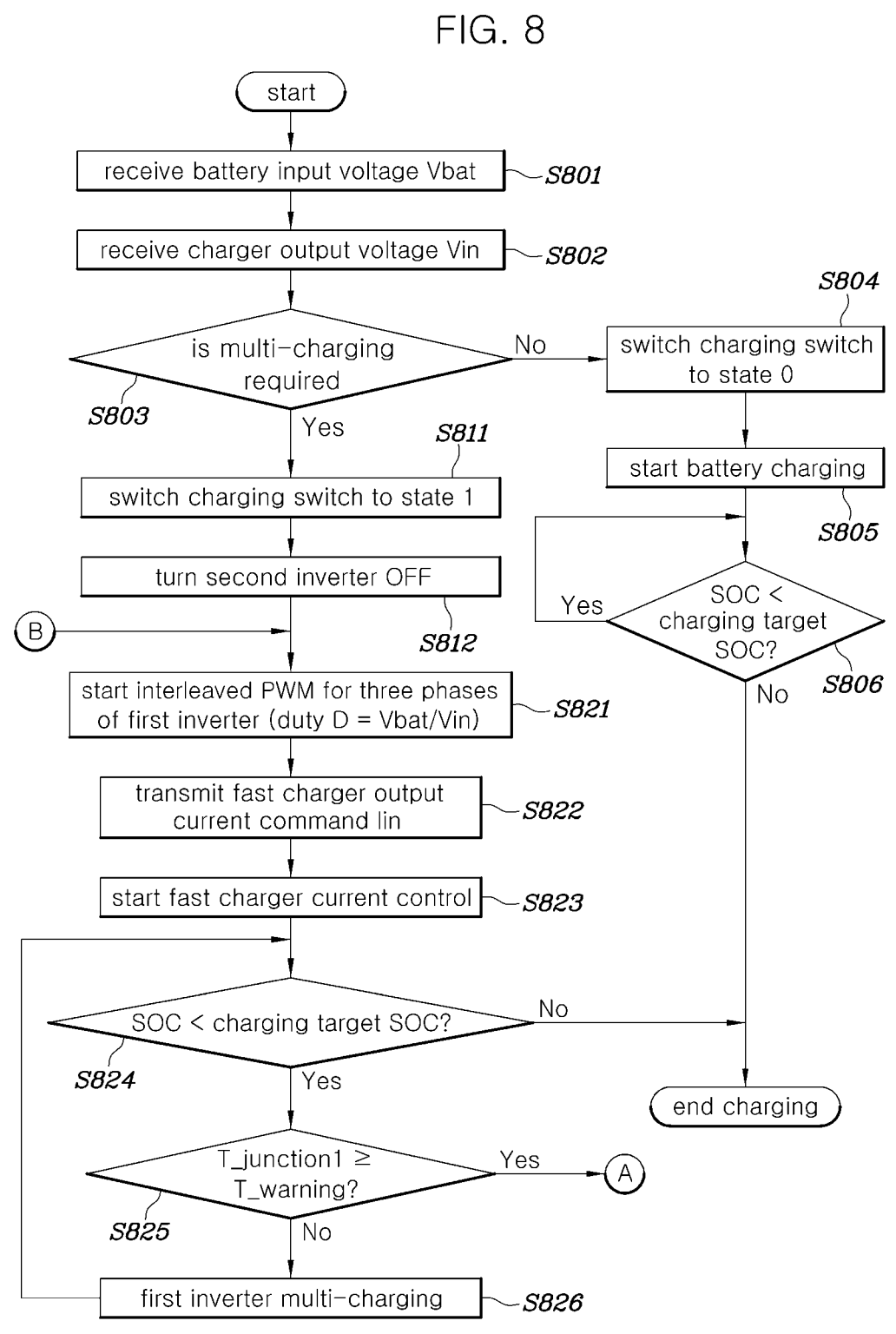
Figure 9:
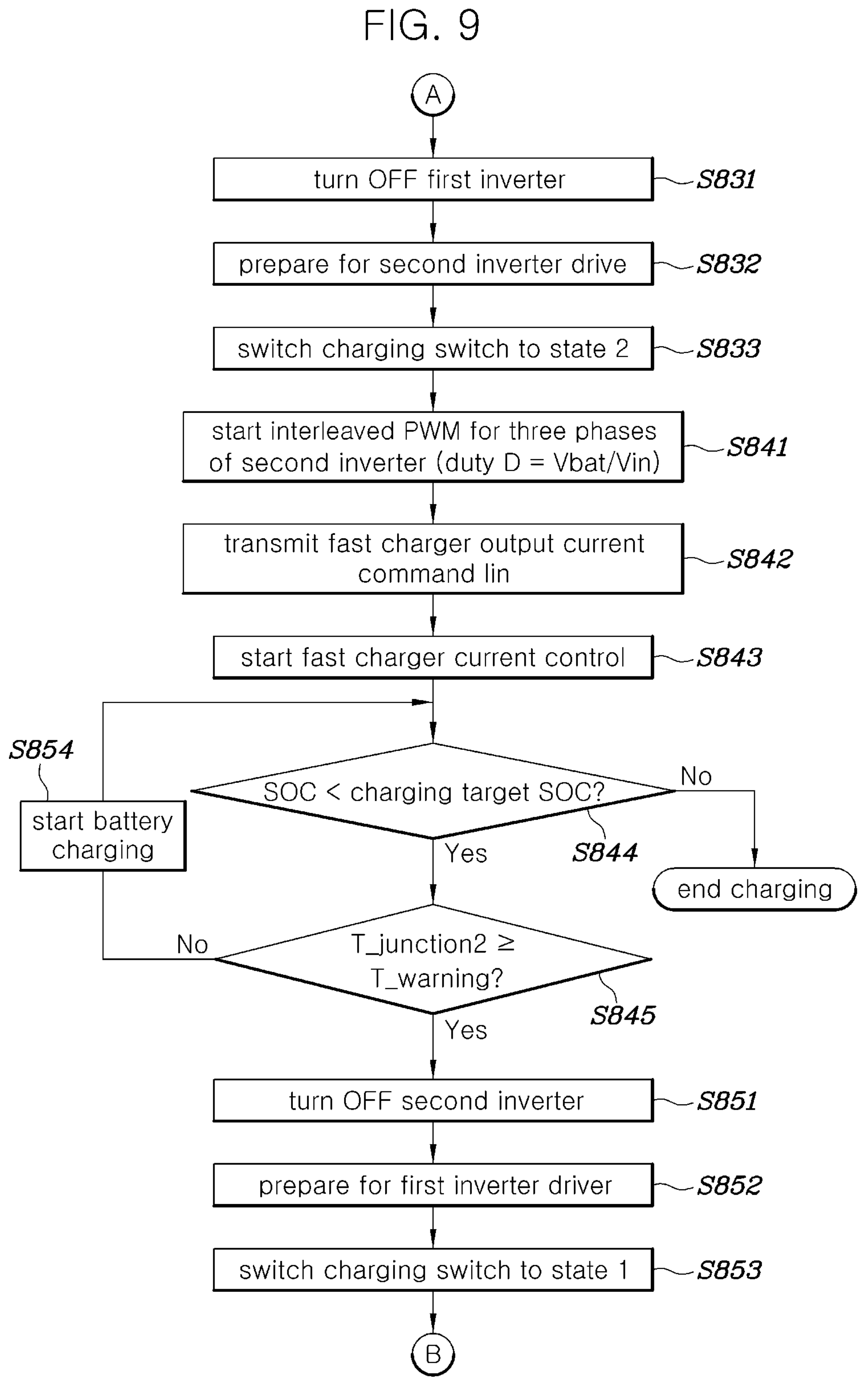

FIG. 8 and FIG. 9 are flowcharts illustrating a controller alternating between a multi-charging 1 method and a multi-charging 2 method based on switching element temperature according to an exemplary embodiment of the present disclosure.

It is assumed that the motor drive system in FIG. 8 and FIG. 9 also include the configuration in FIG. 5 and the charging switch S100E includes the state 1 by default during multi-charging.

FIG. 8 shows that in response that charging the high-voltage battery 200 from the fast charger 1000 gets started, the VCU 60 may receive the voltage Vbat of the battery 200 from the BMS 70 (S801) and may receive the external input voltage (Vin) of the fast charger 300 from the VCM 80 (S802). At the instant time, the VCU 60 may be configured to determine whether multi-charging is required based on comparison results between the magnitude of Vbat and Vin (S803).

In response that Vbat is higher than Vin (e.g., in response that Vbat is 800 V while Vin is 1000 V), multi-charging is unrequired (NO in S803). Therefore, the VCU 60 may be configured for controlling the charging switch S100E into the state 0 (S804), and the VCMS 80 may command the start of charging the high-voltage battery 200 (S805). At the instant time, the VCMS 80 may be configured for controlling to continue the present charging operation until the SOC value of the high-voltage battery reaches the charging target SOC (S806).

The steps S801, S802, S803 and S804 may be performed based on the determination and control of the MCU 50 instead of the VCU 60.

In contrast, in response that Vbat is lower than Vin (e.g., in response that Vbat is 800 V while Vin is 500 V), multi-charging may be required (YES in S803).

In the instant case, the VCU 60 may be configured for controlling the charging switch S100E into the state 1 (S811). At the instant time, the state 1 may refer to a state where the controller 50 controls the charging switch S100E to connect the first changeover switch S10 and the fast charger 1000. As described above, the present step may also be performed by the MCU 50.

The MCU 50 may be configured for controlling to keep all the inverters 20, 30, 40 except the first inverter 10 in the OFF state (S812). As assumed above, the charging switch S100E remains in the state 1 according to the default setting.

The MCU 50 may be configured for controlling the first inverter 10 by the multi-charging 1 method. As described with reference to FIG. 1, the MCU 50 may be configured for controlling the switching elements S11, S12, S13, S14, S15 and S16 of the first inverter 10 to start the pulse-width modulation control of the first inverter 10 required for multi-charging at the instant time (S821). In the instant case, the MCU 50 may be configured to determine the duty ratio D, required for pulse-width modulation control, to be D=Vbat/Vin. Furthermore, in addition to controlling the first inverter for multi-charging, the VCU 60 may transmit an output current command Iin received from the MCU 50 to the VCMS 80 (S822), and the VCMS 80 may start to control the output current of the fast charger 1000 based on the command (S823).

Subsequently, the MCU 50 may be configured to determine whether conditions for terminating battery charging and switching to the multi-charging 2 method are met. In the present process, the MCU 50 may compare the SOC value of the high-voltage battery 200 received from the BMS 70 and the charging target SOC value to determine whether or not to terminate the charging (S824). For example, when the charging target SOC is 95 (%), the MCU 50 may terminate the charging if the SOC value received from the BMS 70 is greater than 95 (NO in S824) and determine on the temperature condition if the SOC value is less than 95 (YES in S824) (S825).

When only the first inverter 10 is used for multi-charging, heat generation in the switching elements S11, S12, S13, S14, S15 and S16 may cause problems such as reduced durability, charging efficiency loss, increased charging time, and the like. Therefore, the MCU 50 may be configured to determine whether or not to switch to the multi-charging 2 method based on the temperature of the switching elements S11, S12, S13, S14, S15 and S16 of the first inverter 10 and the switching elements S10A, S10B and S10C of the first changeover switch S10 (S825).

For example, the temperature of the element including the highest temperature among the switching elements S11, S12, S13, S14, S15 and S16 of the first inverter 10 or the switching elements S10A, S10B and S10C of the first changeover switch S10 may be defined as T_junction1. In the same manner, the temperature of the element including the highest temperature among the switching elements S21, S22, S23, S24, S25 and S26 of the second inverter 20 and the switching elements S20A, S20B and S20C of the second changeover switch 20 may be defined as T-junction 2.

At the present time, when T-junction1 is lower than the preset condition T-warning (NO in S825), the MCU 50 may be configured for controlling to keep implementing the multi-charging 1 method using the first inverter 10 (S826). However, the temperature of the element including the highest temperature, referred to as the comparison target of the preset condition, is an illustrative example. T_junction1 may be determined to be the average temperature of the switching elements S11, S12, S13, S14, S15 and S16 of the first inverter 10 and the switching elements S10A, S10B and S10C of the first changeover switch S10 or a preset value identified through repeated experiments as minimizing problems such as reduced durability, lowered charging efficiency, increased charging time, and the like. In the same manner, the above condition is not limited to temperature, and whether or not to switch may be determined based on the time spent performing the multi-charging 1.

FIG. 9 shows that when the T_junction1 is higher than the preset condition T_warning or same (YES in S825), the MCU 50 may terminate multi-charging by the multi-charging 1 method to switch to the multi-charging 2 method. To the present end, the MCU 50 may switch all the switching elements S11, S12, S13, S14, S15 and S16 of the first inverter 10 to the OFF state (S831), prepare to operate the second inverter 20 (S832), and control the charging switch S100E into the state 2 (S833). In the instant case, the third and fourth inverters 30, 40 may already be in the OFF state.

For example, the process of the MCU 50 switching all the switching elements S11, S12, S13, S14, S15 and S16 of the first inverter 10 to the OFF state (S831) may include initializing T_junction1 data and transmitting a system shutdown command and a restart standby command to the first inverter 10 by the MCU 50.

Another example is the preparation to operate the second inverter 20 (S832) which may include initializing T_junction2 data and an inverter initialization command and a restart command to the second inverter by the MCU 50.

Subsequently, the MCU 50 may be configured for controlling the second inverter for multi-charging (S841). As described with reference to FIG. 1, the MCU 50 may be configured for controlling the switching elements S21, S22, S23, S24, S25 and S26 of the second inverter 20 to start the control of the pulse-width modulation control of the second inverter 20 required for multi-charging At the instant time. In the instant case, the MCU 50 may be configured to determine the duty ratio D, required for pulse-width modulation control, to be D=Vbat/Vin. Furthermore, in addition to controlling the second inverter for multi-charging, the VCU 60 may transmit an output current command lin to the VCMS 80 (S842), and the VCMS 80 may start to control the output current of the fast charger 1000 based on the command (S843).

Subsequently, in a manner similar to the description in S824, S825, and S826, the MCU 50 may be configured to determine whether conditions for terminating battery charging and switching to the multi-charging 1 method are met. The MCU 50 may be configured to determine whether or not to terminate the charging based on comparison results between the SOC value of the high-voltage battery 200 received from the BMS 70 and the charging target SOC value to (S844). The MCU 50 may terminate the charging when the SOC value received from the BMS 70 is greater than the charging target SOC (NO in S844) and determine whether or not to switch to the multi-charging 1 method when the SOC value is less than the target SOC (YES in S844) (S845). When T_junction2 is lower than the preset condition T_warning (NO in S845), the MCU 50 may be configured for controlling to keep performing the multi-charging by the multi-charging 2 method (S846). However, the termination condition described above is an illustrative example. The termination condition may be met even when the MCU 50 receives a charging termination command from the VCU 60 or VCM 80 due to a user terminating the charging or the like.

When T_junction2 is higher than the preset condition T_warning or same (YES in S845), the MCU 50 may terminate multi-charging by the multi-charging 2 method to switch to the multi-charging 1 method. To the present end, the MCU 50 may switch the switching elements S21, S22, S23, S24, S25 and S26 of the second inverter 20 to the OFF state (S851), prepare to operate the first inverter 10 (S852), and control the charging switch S100E into the state 1 (S853). Since the next process is the same as the operating process of the multi-charging 1 method described above, its repetitive description will be omitted.

This control method may apply not just to the exemplary embodiment in FIG. 5 but similarly to the case in which the inverters (10 and 20 respectively) are included at one end of the motors (100A and 100B respectively), as in the exemplary embodiment in FIG. 4.

Similarly, the control method may apply not just to the multi-charging 1 and 2 methods in the exemplary embodiment in FIG. 5 but to the exemplary embodiment further including the multi-charging 3 and 4 methods in FIG. 6.

For example, in the case of an electrified vehicle to which an illustrative example of this applies as illustrated in FIG. 6, the second to fourth inverters 20, 30, 40 and the second to fourth changeover switches S20, S30, S40 except the first inverter and the first changeover switch S10 may all be kept in the OFF state during the multi-charging 1 in preparation for multi-charging (S811-S812).

At the present time, when the preset temperature condition is met in the state 2 (YES in S845), the system may be controlled so that the multi-charging 3 and multi-charging 4 are alternated in the third and state 4s, rather than switching back to the state 1.

Furthermore, when the preset temperature condition is met in the state 1 (YES in S825), the switching to the multi-charging method that utilizes the inverter including the switching element including the lowest temperature among the second inverter 20, the third inverter 30, and the fourth inverter 40 may be further included.

Furthermore, the term related to a control device such as "controller", "control apparatus", "control unit", "control device", "control module", "control circuit", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Software implementations may include software components (or elements), object-oriented software components, class components, task components, processes, functions, attributes, procedures, subroutines, program code segments, drivers, firmware, microcode, data, database, data structures, tables, arrays, and variables. The software, data, and the like may be stored in memory and executed by a processor. The memory or processor may employ a variety of means well-known to a person including ordinary knowledge in the art.

Furthermore, the terms such as "unit", "module", etc. included in the specification mean units for processing at least one function or operation, which may be implemented by hardware, software, or a combination thereof.

In the flowchart described with reference to the drawings, the flowchart may be performed by the controller or the processor. The order of operations in the flowchart may be changed, a plurality of operations may be merged, or any operation may be divided, and a predetermined operation may not be performed. Furthermore, the operations in the flowchart may be performed sequentially, but not necessarily performed sequentially. For example, the order of the operations may be changed, and at least two operations may be performed in parallel.

Hereinafter, the fact that pieces of hardware are coupled operatively may include the fact that a direct and/or indirect connection between the pieces of hardware is established by wired and/or wirelessly.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An electrified vehicle comprising:

a battery;

a first motor;

a first inverter connected to the battery and the first motor and including a plurality of first switching elements;

a second motor;

a second inverter connected to the battery and the second motor and including a plurality of second switching elements;

a charging switch configured to selectively connect a neutral point of the first motor or a neutral point of the second motor to a charging power input stage; and a controller configured to control the charging switch to connect the charging power input stage to the neutral point of the first motor or the neutral point of the second motor in response to charging the battery with power input through the charging power input stage, wherein the charging switch includes a first state in which the charging power input stage is connected to the neutral point of the first motor and a second state in which the charging power input stage is connected to the neutral point of the second motor; and wherein the controller is further configured to control switching between the first state and second state based on at least either temperature of the plurality of first switching elements or temperature of the plurality of second switching elements.

2. The electrified vehicle of claim 1, wherein the first motor includes a plurality of first windings, a first end of each first winding connected to the first inverter, and wherein the second motor includes a plurality of second windings, a first end of each second winding connected to the second inverter.

3. The electrified vehicle of claim 2, wherein second ends of the plurality of first windings are interconnected to form the neutral point of the first motor, and wherein second ends of the plurality of second windings are interconnected to form the neutral point of the second motor.

4. The electrified vehicle of claim 1, wherein the controller is further configured to control the charging switch to alternate between the first state and the second state.

5. The electrified vehicle of claim 1, wherein the controller is further configured to turn off the second inverter, control the charging switch into the first state, and control the first inverter using pulse-width modulation to boost an external input voltage and charge the battery in response that the external input voltage meets a preset condition.

6. The electrified vehicle of claim 5, wherein the controller is further configured to turn off the first inverter, switch the charging switch into the second state, and control the second inverter using pulse-width modulation to boost the external input voltage and charge the battery in response that the temperature of at least one of the plurality of first switching elements is higher than a preset temperature or same during charging through pulse-width modulation control of the first inverter.

7. The electrified vehicle of claim 6, wherein the controller is further configured to turn off the second inverter, control the charging switch into the first state, and control the first inverter using pulse-width modulation to boost the external input voltage and charge the battery in response that the temperature of at least one of the plurality of second switching elements is higher than a preset temperature or same during charging through pulse-width modulation control of the second inverter.

8. An electrified vehicle comprising:

a battery;

a first motor;

a first inverter connected to the battery and the first motor and including a plurality of first switching elements;

a second motor;

a second inverter connected to the battery and the second motor and including a plurality of second switching elements;

a third inverter including a plurality of third switching elements;

a first changeover switch including a plurality of fourth switching elements;

a charging switch configured to selectively connect a neutral point of the first motor or a neutral point of the second motor to a charging power input stage; and a controller configured to control the charging switch to connect the charging power input stage to the neutral point of the first motor or the neutral point of the second motor in response to charging the battery with power input through the charging power input stage, wherein the first motor includes a plurality of first windings, a first end of each first winding connected to the first inverter, wherein the second motor includes a plurality of second windings, a first end of each second winding connected to the second inverter, wherein the third inverter is connected to a second end of each first winding, wherein a first end of each fourth switching element is connected to the second end of each first winding and second ends of the fourth switching elements are interconnected, wherein the first changeover switch provides the neutral point of the first motor in response that the plurality of fourth switch elements are turned on, wherein the charging switch includes a first state in which the charging power input stage is connected to the second ends of the first changeover switch and a second state in which the charging power input stage is connected to the neutral point of the second motor, and wherein the controller is further configured to control switching between the first state and the second state based on at least either temperature of the plurality of first switching elements or temperature of the plurality of second switching elements.

9. The electrified vehicle of claim 8, wherein the controller is further configured to control the charging switch to alternate between the first state and the second state.

10. The electrified vehicle of claim 8, wherein the controller is further configured to turn off the second inverter, turn on the first changeover switch, control the charging switch into the first state, and is configured to control the first inverter using pulse-width modulation to boost an external input voltage and charge the battery in response that the external input voltage meets a preset condition.

11. The electrified vehicle of claim 10, wherein the controller is further configured to turn off the first inverter and the first changeover switch, switch the charging switch into the second state, and control the second inverter using pulse-width modulation to boost the external input voltage and charge the battery in response that the temperature of at least one of the plurality of first switching elements is higher than a preset temperature or same during charging through pulse-width modulation control of the first inverter.

12. The electrified vehicle of claim 11, wherein the controller is further configured to turn off the second inverter, turn on the first changeover switch, control the charging switch into the first state, and control the first inverter using pulse-width modulation to boost the external input voltage and charge the battery in response that the temperature of at least one of the plurality of second switching elements is higher than a preset temperature or same during charging through pulse-width modulation control of the second inverter.

* * * * *